(12) United States Patent
Kunishige

(10) Patent No.: US 6,249,615 B1
(45) Date of Patent: Jun. 19, 2001

(54) SCANNER FOR READING COLOR IMAGES FROM FILM

(75) Inventor: Keiji Kunishige, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/098,648

(22) Filed: Jun. 17, 1998

(30) Foreign Application Priority Data

Jul. 7, 1997 (JP) .................................................... 9-181140

(51) Int. Cl.[7] .................................................. H04N 1/407
(52) U.S. Cl. ........................................... 382/274; 358/461
(58) Field of Search ............................ 382/274; 358/461, 358/443, 446, 487, 483, 482, 471

(56) References Cited

U.S. PATENT DOCUMENTS

| 4,051,458 | * | 9/1977 | Morton | 382/274 |
|---|---|---|---|---|
| 4,783,836 | * | 11/1988 | Takashima | 382/274 |
| 4,922,335 | * | 5/1990 | Outa et al. | 358/506 |
| 5,260,753 | * | 11/1993 | Haneda et al. | 399/54 |
| 5,402,249 | * | 3/1995 | Koseki et al. | 358/446 |
| 5,640,465 | * | 6/1997 | Smitt | 382/172 |
| 5,694,225 | * | 12/1997 | Suzuki | 358/461 |

FOREIGN PATENT DOCUMENTS 61-121667  6/1986  (JP).

* cited by examiner

*Primary Examiner*—Scott Rogers
(74) *Attorney, Agent, or Firm*—Frishauf, Holtz, Goodman, Langer & Chick, P.C.

(57) ABSTRACT

An illuminating unit illuminates a plurality of different types of color original images. A line sensor reads each color original image and outputs an image signal. An AD-converting unit AD-converts the output image signal from the line sensor based on a reference voltage. A storage unit stores digital data corresponding to the reference voltage of the AD-converting unit. A converting unit converts the output from the AD-converting unit into an output voltage from the line sensor (CCD) based on the digital data. An operating unit performs at least one of a shading correction operation, a color conversion operation, and a gradation conversion operation based on the output from the converting unit. High-quality images are obtained regardless of the types of color originals by performing equal shading correction processes regardless of the types of color originals.

19 Claims, 12 Drawing Sheets

| | ADDRESS | CORRECTION COEFFICIENT |
|---|---|---|
| $R_1$ PIXEL → | A 0 0 0 0 | 1.00 |
| $R_2$ PIXEL → | A 0 0 0 1 | 1.01 |
| $R_3$ PIXEL → | A 0 0 0 2 | 1.05 |
| ⋮ | ⋮ | ⋮ |
| $R_{4096}$ PIXEL → | A F F F F | · |
| $G_1$ PIXEL → | B 0 0 0 0 | · |
| $G_2$ PIXEL → | B 0 0 0 1 | · |
| $G_3$ PIXEL → | B 0 0 0 2 | · |
| ⋮ | ⋮ | ⋮ |
| $G_{4096}$ PIXEL → | B F F F F | · |
| $B_1$ PIXEL → | C 0 0 0 0 | · |
| ⋮ | ⋮ | ⋮ |
| $B_{4096}$ PIXEL → | C F F F F | · |

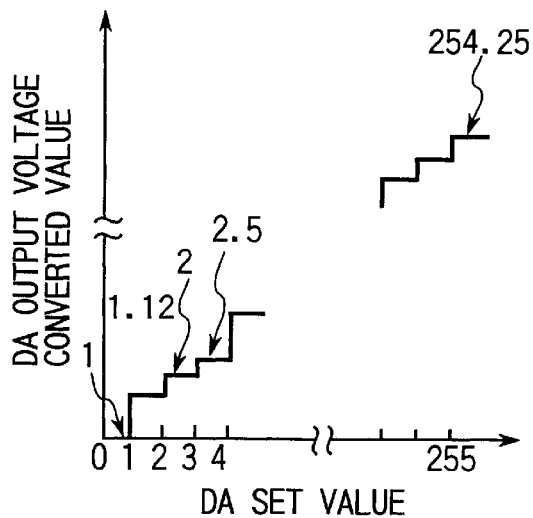
FIG. 15A
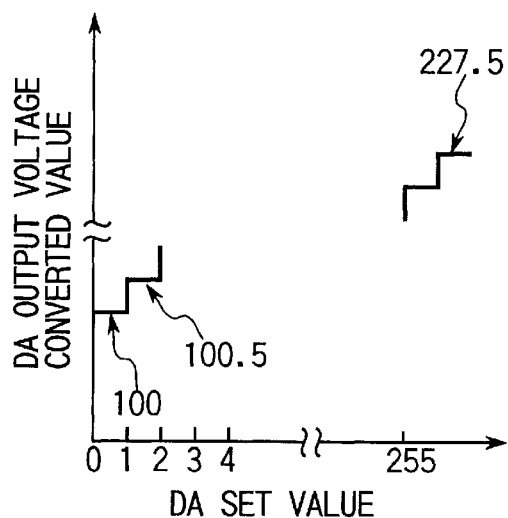
FIG. 15B
| ADDRESS | DATA |
|---|---|
| 0 0 0 | 0.0 |
| 0 0 1 | 1.12 |
| 0 0 2 | 2.00 |
| ⋮ | ⋮ |
| OFF | 254.25 |
FIG. 16A
| | |
|---|---|
| 0 0 0 | 100 |
| 0 0 1 | 100.5 |
| 0 0 2 | |
| ⋮ | ⋮ |
| OFF | 227.5 |
FIG. 16B

SCANNER FOR READING COLOR IMAGES FROM FILM

BACKGROUND OF THE INVENTION

The present invention relates to an image reading apparatus and, more particularly, to an image reading apparatus which is applied to a film scanner system for reading color images and has a shading correction function for performing shading correction and the like.

Conventional image reading apparatuses such as a film scanner system for reading color images use a color linear sensor such as a CCD to read color images.

Unfortunately, in image reading apparatuses using a color linear sensor such as a CCD, the sensitivity varies from one pixel to another due to, e.g., an uneven density of RGB filters, an uneven photoelectric conversion efficiency, or an uneven transfer efficiency. This significantly deteriorates the quality of read images.

Such unevenness is generally called shading.

This shading is produced not only by a color linear sensor such as a CCD described above but also by the nonuniformity of luminance of an illuminating light source itself. This nonuniformity results from the shadow of mercury grains of a fluorescent lamp used as a light source for illuminating color images or from uneven coating of a phosphor.

One conventional method (to be referred to as a shading correction hereinafter) of eliminating the influence of this shading is to prestore shading patterns and correct shading by multiplying a sensor output by an inverse coefficient on the basis of the stored shading patterns.

In the shading correction as described above, however, if color originals have substantially different optical characteristics, no equally optimal corrections can be performed for these color originals.

For example, when color originals are a negative film and a positive film, the quality of an image deteriorates upon shading correction of the positive film if shading correction of the negative film is optimized.

Jpn. Pat. Appln. KOKAI Publication No. 61-121667, therefore, has disclosed a method of performing different shading correction processes for a negative film and a positive film by checking whether the color original is a negative film and a positive film.

Unfortunately, the shading correction processes as disclosed in Jpn. Pat. Appln. KOKAI Publication No. 61-121667 require a memory with a very large capacity to store shading parameters.

Accordingly, the method disclosed in Jpn. Pat. Appln. KOKAI Publication No. 61-121667 wastes a very large memory capacity.

BRIEF SUMMARY OF THE INVENTION

It is an object of the present invention to provide an image reading apparatus capable of obtaining high-quality images regardless of the types of color originals by performing equal shading correction processes regardless of the types of color originals without wasting memory capacity.

To achieve the above object, according to the first aspect of the present invention, there is provided an image reading apparatus comprising illuminating means for illuminating a color image, an imaging device for reading the color image illuminated by the illuminating means and outputting an image signal, AD-converting means for performing analog-to-digital (AD) conversion for the output image signal from the imaging device, storage means for storing digital data corresponding to a reference voltage of the AD-converting means, converting means for converting an output from the AD-converting means into an equivalent voltage value of the output image signal from the imaging device based on the digital data stored in the storage means, and shading correction means for performing shading correction for an output from the converting means.

According to the second aspect of the present invention, there is provided an image reading apparatus comprising illuminating means for illuminating a color image, an imaging device for reading the color image illuminated by the illuminating means and outputting an image signal, AD-converting means for performing analog-to-digital (AD) conversion for the output image signal from the imaging device, reference voltage setting means for setting a reference voltage of the AD-converting means based on the output image signal from the imaging device, storage means for storing digital data corresponding to the reference voltage set by the reference voltage setting means, converting means for converting an output from the AD-converting means into an equivalent voltage value of the output image signal from the imaging device based on the digital data stored in the storage means, and shading correction means for performing shading correction for an output from the converting means.

According to the third aspect of the present invention, there is provided an image reading apparatus comprising illuminating means for illuminating a color image, an imaging device for reading the color image illuminated by the illuminating means and outputting an image signal, AD-converting means for performing analog-to-digital (AD) conversion for the output image signal from the imaging device, storage means for storing digital data corresponding to a reference voltage of the AD-converting means, converting means for converting an output from the AD-converting means into an equivalent voltage value of the output image signal from the imaging device based on the digital data stored in the storage means, and arithmetic means for performing at least one of a shading correction operation, a color conversion operation, and a gradation conversion operation for an output from the converting means.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 15A and 15B are graphs for explaining a case wherein a digital value and a voltage output value are not proportional such as when a D/A circuit 50 has a quantization error or when the swing width does not start from 0 V and has a certain bias; and FIGS. 16A and 16B are views for explaining how to individually measure actual output voltage converted values of digital data as set values from 0 to 255 of the D/A circuit 50 and write the measured data in those addresses of the EEPROM 51 which correspond to the D/A set values before shipment from a factory.

DETAILED DESCRIPTION OF THE INVENTION

Figure 1:
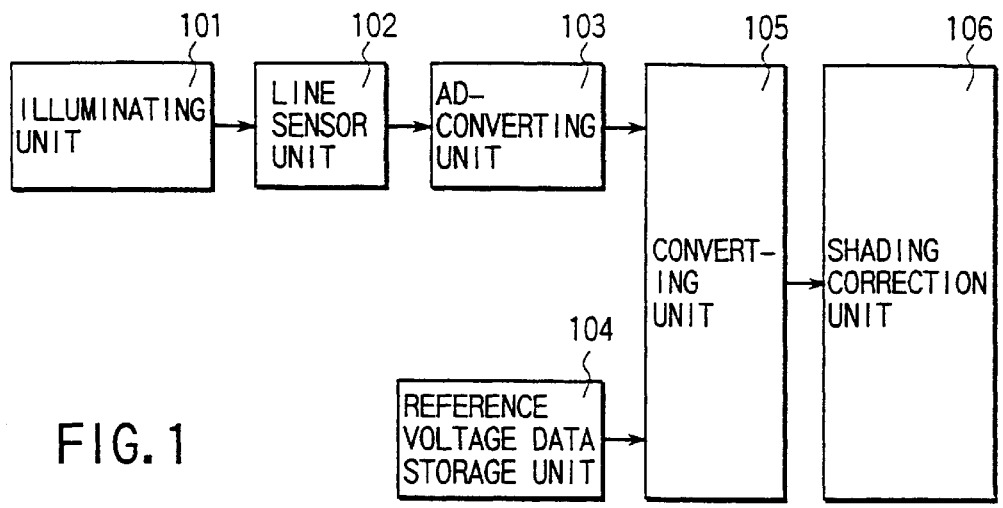
FIG. 1 is a schematic block diagram showing the first arrangement of an image reading apparatus according to the present invention.

Reference will now be made in detail to the presently preferred embodiments of the invention as illustrated in the accompanying drawings, in which like reference characters designate like or corresponding parts throughout the several drawings.

First, an outline of an image reading apparatus according to the present invention will be described below with reference to FIGS. 1 to 4.

FIG. 1 is a schematic block diagram showing the first arrangement of the image reading apparatus according to the present invention.

This image reading apparatus comprises an illuminating unit 101, a line sensor unit 102 such as a CCD, an AD-converting unit 103, a reference voltage storage unit 104, a converting unit 105, and a shading correction unit 106. The illuminating unit 101 illuminates a plurality of different types of color images. The line sensor unit 102 reads a color image and outputs an image signal. The AD-converting unit 103 AD-converts the output from the line sensor unit 102. The reference voltage storage unit 104 stores digital data corresponding to a reference voltage of the AD-converting unit 103. The converting unit 105 converts the output from the AD-converting unit 103 into an output voltage of the line sensor unit 102 on the basis of the digital data stored in the reference voltage storage unit 104. The shading correction unit 106 performs shading correction on the basis of the output from the converting unit 105.

Figure 2:
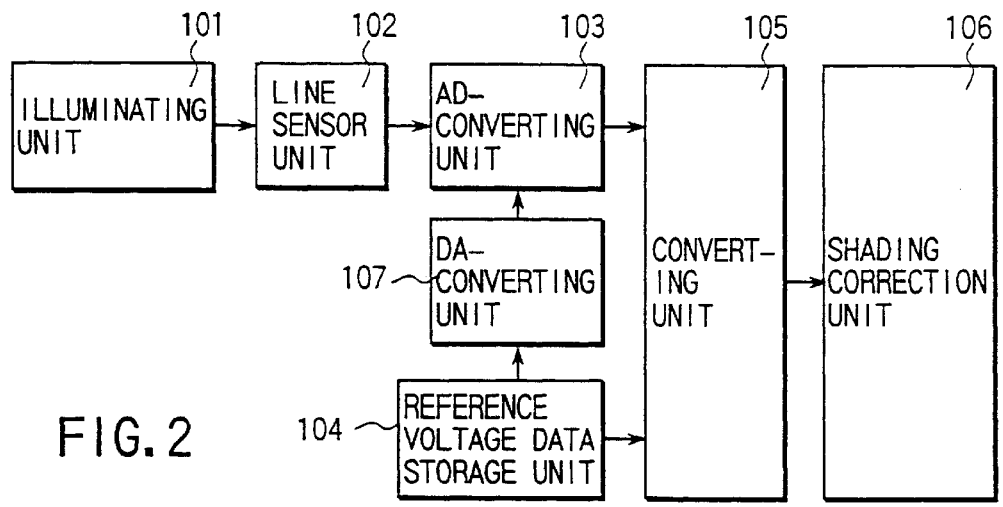
FIG. 2 is a schematic block diagram showing the second arrangement of the image reading apparatus according to the present invention.

FIG. 2 is a schematic block diagram showing the second arrangement of the image reading apparatus according to the present invention.

This image reading apparatus comprises an illuminating unit 101, a line sensor unit 102 such as a CCD, an AD-converting unit 103, a DA-converting unit 107 for setting a reference voltage, a reference voltage storage unit 104, a converting unit 105, and a shading correction unit 106. The illuminating unit 101 illuminates a plurality of different types of color images. The line sensor unit 102 reads a color image and outputs an image signal. The AD-converting unit 103 AD-converts the output from the line sensor unit 102. The DA-converting unit 107 sets the reference voltage of the AD-converting unit 103 on the basis of color image data. The reference voltage storage unit 104 stores digital data for setting the reference voltage. The converting unit 105 converts the output from the AD-converting unit 103 into an output voltage of the line sensor unit 102 on the basis of the digital data. The shading correction unit 106 performs shading correction on the basis of the output from the converting unit 105.

Figure 3:
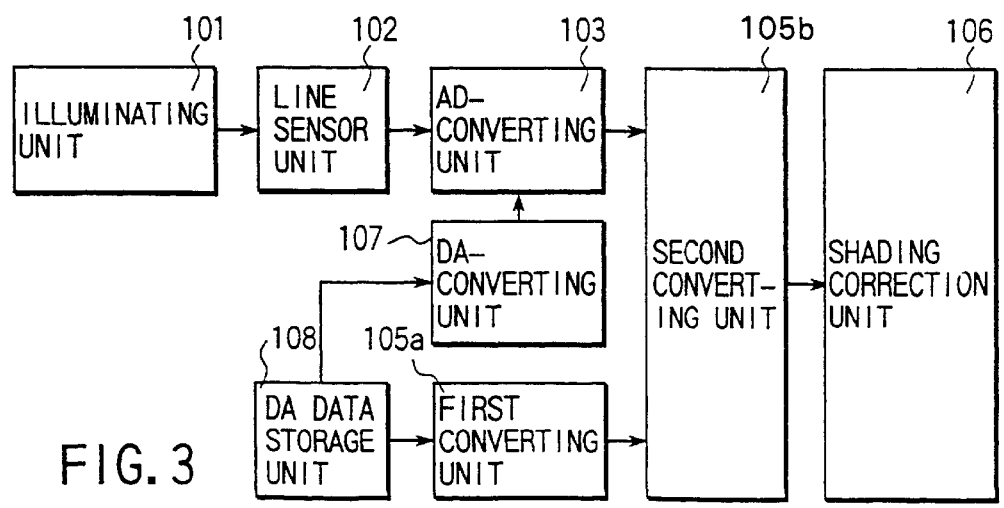
FIG. 3 is a schematic block diagram showing the third arrangement of the image reading apparatus according to the present invention.

FIG. 3 is a schematic block diagram showing the third arrangement of the image reading apparatus according to the present invention.

This image reading apparatus comprises an illuminating unit 101, a line sensor unit 102 such as a CCD, an AD-converting unit 103, a DA-converting unit 107 for setting a reference voltage, a DA data storage unit 108, a reference voltage storage unit 104, a first converting unit 105a, a second converting unit 105b, and a shading correction unit 106. The illuminating unit 101 illuminates a plurality of different types of color images. The line sensor unit 102 reads a color image and outputs an image signal. The AD-converting unit 103 AD-converts the output from the line sensor unit 102. The DA-converting unit 107 sets the reference voltage of the AD-converting unit 103. The DA data storage unit 108 stores digital data for the DA-converting unit 107. The first converting unit 105a converts the output from the DA data storage unit 108 into an output voltage of the line sensor unit 102. The second converting unit 105b converts the output from the AD-converting unit 103 into an output voltage of the line sensor unit 102 on the basis of the output from the first converting unit 105a. The shading correction unit 106 performs shading correction on the basis of the output from the second converting unit 105b.

Figure 4:
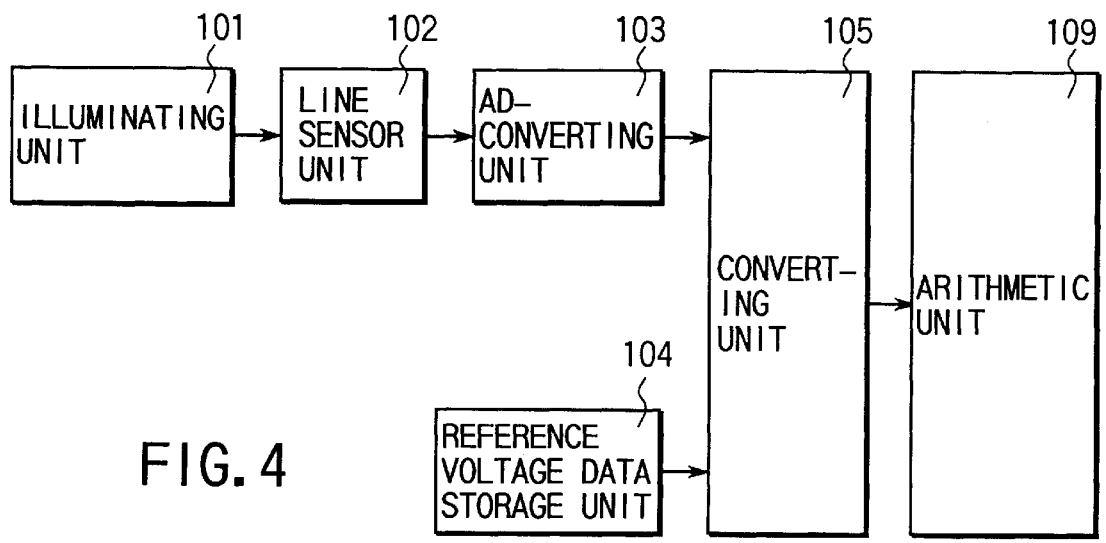
FIG. 4 is a schematic block diagram showing the fourth arrangement of the image reading apparatus according to the present invention.

FIG. 4 is a schematic block diagram showing the fourth arrangement of the image reading apparatus according to the present invention.

This image reading apparatus comprises an illuminating unit 101, a line sensor unit 102 such as a CCD, an AD-converting unit 103, a reference voltage storage unit 104, a converting unit 105, and an arithmetic unit 109. The illuminating unit 101 illuminates a plurality of different types of color images. The line sensor unit 102 reads a color image and outputs an image signal. The AD-converting unit 103 AD-converts the output from the line sensor unit 102. The reference voltage storage unit 104 stores digital data corresponding to a reference voltage of the AD-converting unit 103. The converting unit 105 converts the output from the AD-converting unit 103 into an output voltage of the line sensor unit 102 on the basis of the digital data stored in the reference voltage storage unit 104. The arithmetic unit 109 performs at least one of a shading correction operation, a color conversion operation, and a gradation conversion operation on the basis of the output from the converting unit 105.

A film scanner system applied as one embodiment of the image reading apparatus according to the present invention based on the aforementioned arrangements will be described below with reference to the accompanying drawings.

Figure 5:
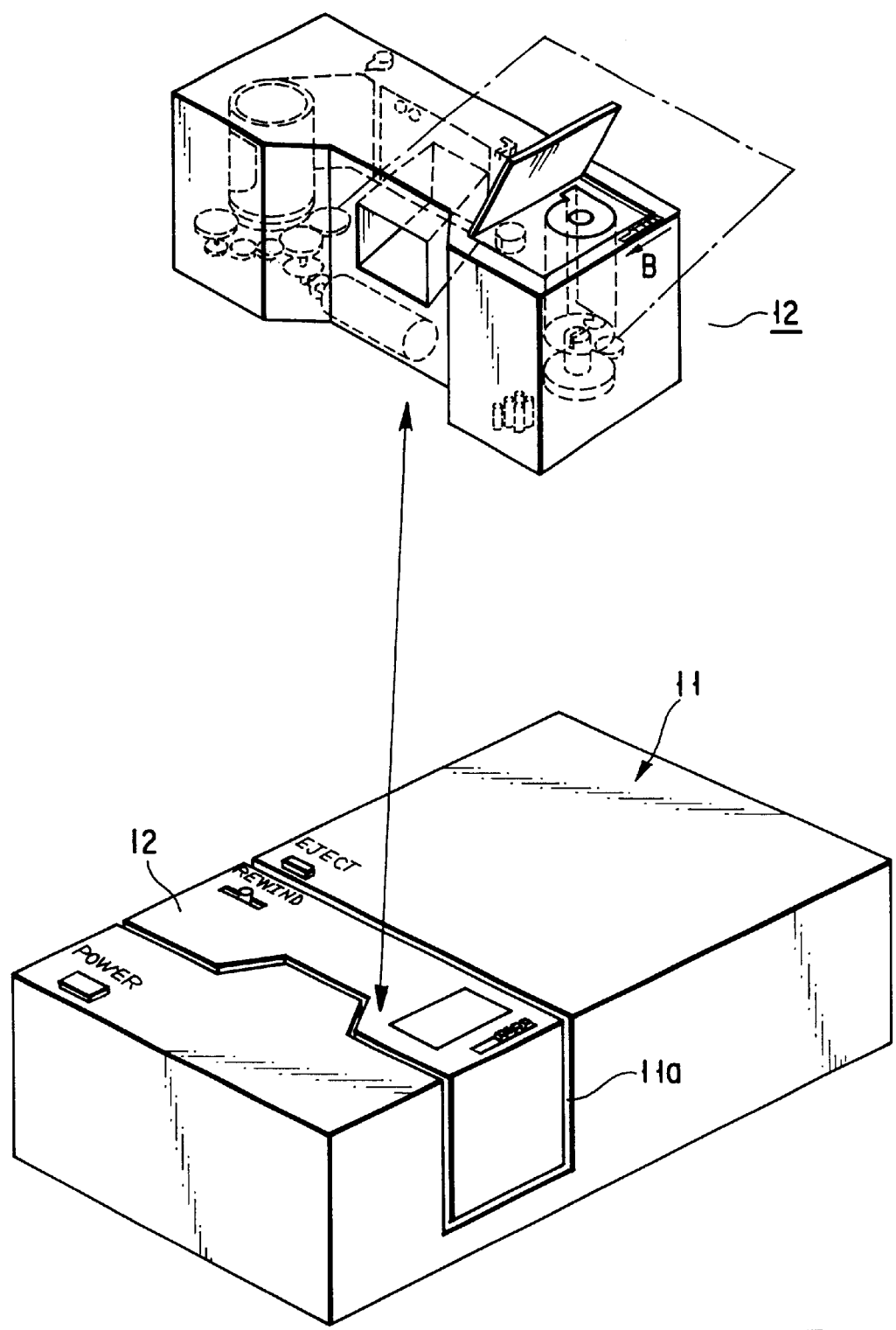
FIG. 5 is a view showing the external appearance of a film scanner applied as one embodiment of the image reading apparatus according to the present invention.

FIG. 5 shows the external appearance of the film scanner applied as one embodiment of the image reading apparatus according to the present invention. This film scanner comprises a scanner main body 11 as a film image input device and a film adapter unit 12 as a cartridge film holding device which can be attached to a groove 11a of the scanner main body 11.

Figure 6:
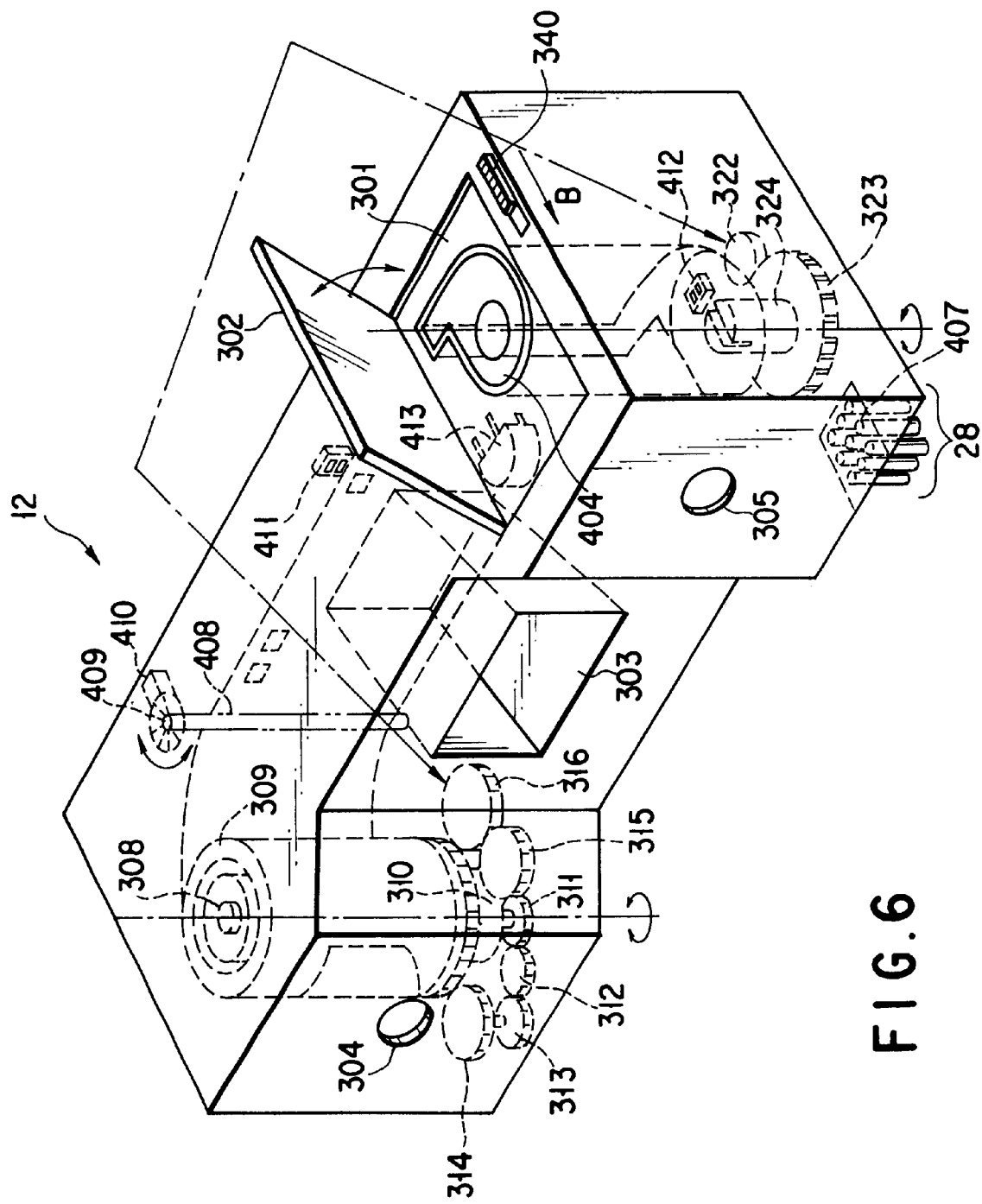
FIG. 6 is a perspective view showing details of the internal structure of a film adapter unit shown in FIG. 5.

FIG. 6 is a perspective view showing details of the internal structure of the film adapter unit 12 as a cartridge film holding device.

In this film adapter unit 12, a cartridge film 404 such as an IX film cartridge (FC) is loaded.

The cartridge film 404 such as an IX film cartridge (FC) loaded in the film adapter unit 12 is wound up or rewound in units of frames as will be described later in the film adapter unit 12.

During wind-up or rewind, an image of each frame of the cartridge film 404 can be seen (projected) through an opening 303 for illumination.

The drive control of the cartridge film 404 is performed by transmitting control information from the scanner main body 11 via electric contacts 28 of the film adapter unit 12.

Referring to FIG. 6, a cartridge compartment 301 into which the cartridge film 404 is inserted includes a cover 302 openable and closable in the directions of arrows.

A lock mechanism 340 for locking the cover 302 is so constituted that the cover 302 is not open unless the upper portion of a switching member (not shown) of the lock mechanism 340 is slid in the direction of an arrow B.

The switching member interlocked with this lock mechanism 340 is incorporated and turned on/off in accordance with open/close of the cover.

That is, the operator can automatically activate "auto-loading" of the cartridge film 404 by manually closing the cover 302.

The operator can also automatically activate "rewind" of the cartridge film 404 by manually opening the cover 302.

The picture of a frame of the cartridge film 404 fed to the position of the opening 303 is optically read through the opening 303 by a film image input device (to be described later).

Recesses 304 and 305 are formed in the side surfaces of the film adapter unit 12 as a cartridge film holding device. When the film adapter unit 12 is loaded into the groove 11a of the scanner main body 11 as a film image input device, positioning pins (not shown) of the scanner main body 11 are fitted in these recesses 304 and 305.

Consequently, the scanner main body 11 as a film image input device and the film adapter unit 12 as a cartridge film holding device are "positioned" in a plane perpendicular to the optical axis.

A plurality of metal pins 407 are also formed on the bottom surface of the film adapter 12 as a cartridge film holding device. When the film adapter unit 12 is loaded into the groove 11a of the scanner main body 11 as a film image input device, these metal pins 407 are biased by leaf springs in contact with the electric contacts 28 of the scanner main body 11.

The film adapter unit 12 as a cartridge film holding device receives power supply for the film adapter unit 12 and a predetermined control signal for film driving from the scanner main body 11 as a film image input device via the electric contacts 28 and thereby scans a desired film picture of the cartridge film 404.

On the other hand, the scanner main body 11 as a film image input device can receive various information sent from the film adapter unit 12 as a cartridge film holding device via the electric contacts 28. Examples of the information are "film driving amount information", "film information", "film cartridge information", "EEPROM information in cartridge", and "SW information" attached to the cartridge.

In the film adapter unit 12 as a cartridge film holding device, a spool 309 for winding up a film extracted from the loaded cartridge film 404 is disposed on the side away from the cartridge compartment 301.

A motor 308 for supplying a driving force for "winding up" and "rewinding" the film is arranged in the rotation center of this spool 309.

The output shaft of the motor 308 meshes with a gear 311 fixed to this shaft and with gears 312, 313, and 314.

The rotational driving force of the motor 308 is transmitted to a gear 310 fixed to the lower portion of the spool 309 via these gears 311, 312, 313, and 314.

A driving shaft 324 is disposed near the center of the lower portion of the cartridge compartment 301. The driving shaft 324 is "gear-connected" to the above gears to engage with and rotate the spool as the central axis of the cartridge.

That is, this driving shaft 324 is fixed to a gear 323 and indirectly coupled with the motor 308 via a gear 322 which meshes with the gear 323.

Also, as shown in FIG. 6, a rod-like film driven roller 408 extending in a direction perpendicular to the feed direction of a film is disposed to detect the driving amount of the film. This film driven roller 408 is brought into contact with the film so as to rotate together with the film.

The end portion of the film driven roller 408 supports a disk-like member (to be referred to as a PI (Photo Interrupter) gear hereinafter) 409 having a predetermined pattern of thin slits in the radial direction.

As this PI gear 409 rotates, a PI 410 as a photosensor so disposed as to clamp the PI gear 409 repetitively detects a "light-shielded state" and a "non-light-shielded state".

Accordingly, the feed amount of the film can be detected by counting output waveform pulses from the PI 410.

That is, a PR (Photo Reflector) 411 for detecting film perforations is disposed in a position corresponding to a predetermined portion of the film, as shown in FIG. 6, in order to detect the driving amount of the film. This PR 411 successively detects the position reference of the film picture.

In addition, a film cartridge information detecting PR 412 for detecting information on the film cartridge 404 is disposed on the bottom surface of the cartridge.

Furthermore, to detect magnetic information of a film, a magnetic head 413 is arranged in a position where the magnetic head 413 opposes a magnetic data area of the film. This magnetic head 413 reads out data recorded in the magnetic data area of the film.

The motor 308 and the sensors (410, 411, and 413) are connected to the metal pins 407 as electric contacts by a flexible printed board (not shown).

Although not described in detail for the sake of simplicity of explanation, an adapter to be loaded as the film adapter unit 12 into the scanner main body 11 is not limited to the one shown in FIG. 6. For example, film adapters for a piece film and a strip film are also usable.

By using these film adapters, a film scanner system capable of scanning various films can be realized.

Figure 7:
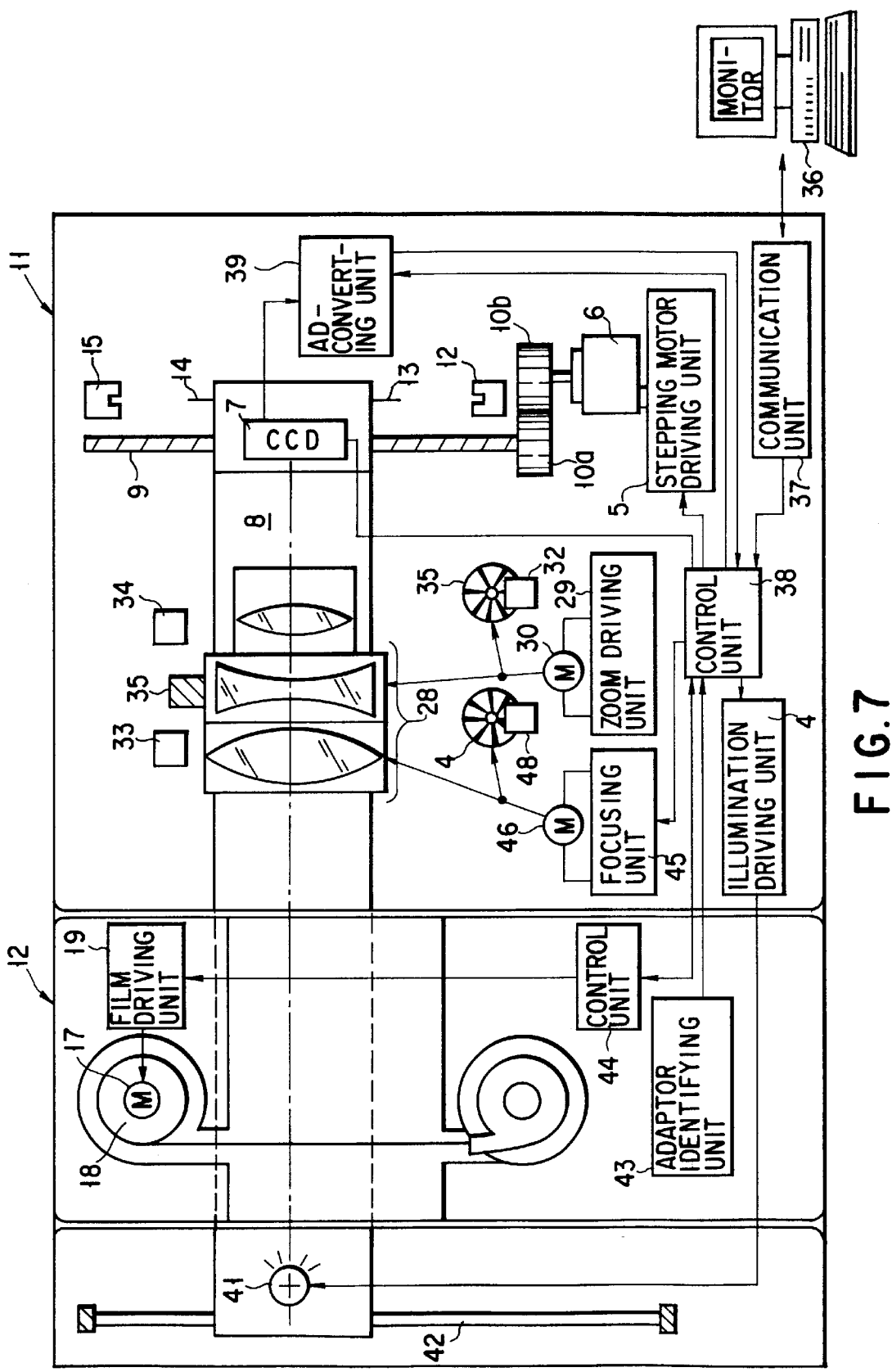
FIG. 7 is a top view showing the internal arrangement of the film scanner system shown in FIG. 5.

FIG. 7 is a top view showing the internal arrangement of the film scanner system shown in FIG. 5.

This internal arrangement will be described in detail below.

"Description of Illuminating System"

The film scanner main body 11 applied as the image reading apparatus according to the present invention shown in FIG. 7 has an illuminating unit for illuminating a film original.

This illuminating unit can be a light source such as an LED or a fluorescent lamp (a hot-cathode tube or a cold-cathode tube). In this embodiment, a fluorescent lamp 41 linearly evenly illuminates a region in the vertical direction of the scanner.

This fluorescent lamp 41 is inverter-driven at about 100 kHz by an illumination driving unit 4 (in this embodiment, an inverter circuit). That is, the fluorescent lamp 41 is driven by a cycle much faster than the integration time of a line CCD 7 (to be described later).

In common fluorescent lamps, the electrode portion is easily heated to a very high temperature, and a wire connected to this portion by general soldering peels off even by a slight stress. To prevent this disconnection, the electrode portion is reliably connected to a lead wire by "caulking" in this embodiment.

Figures 8A, 8B:
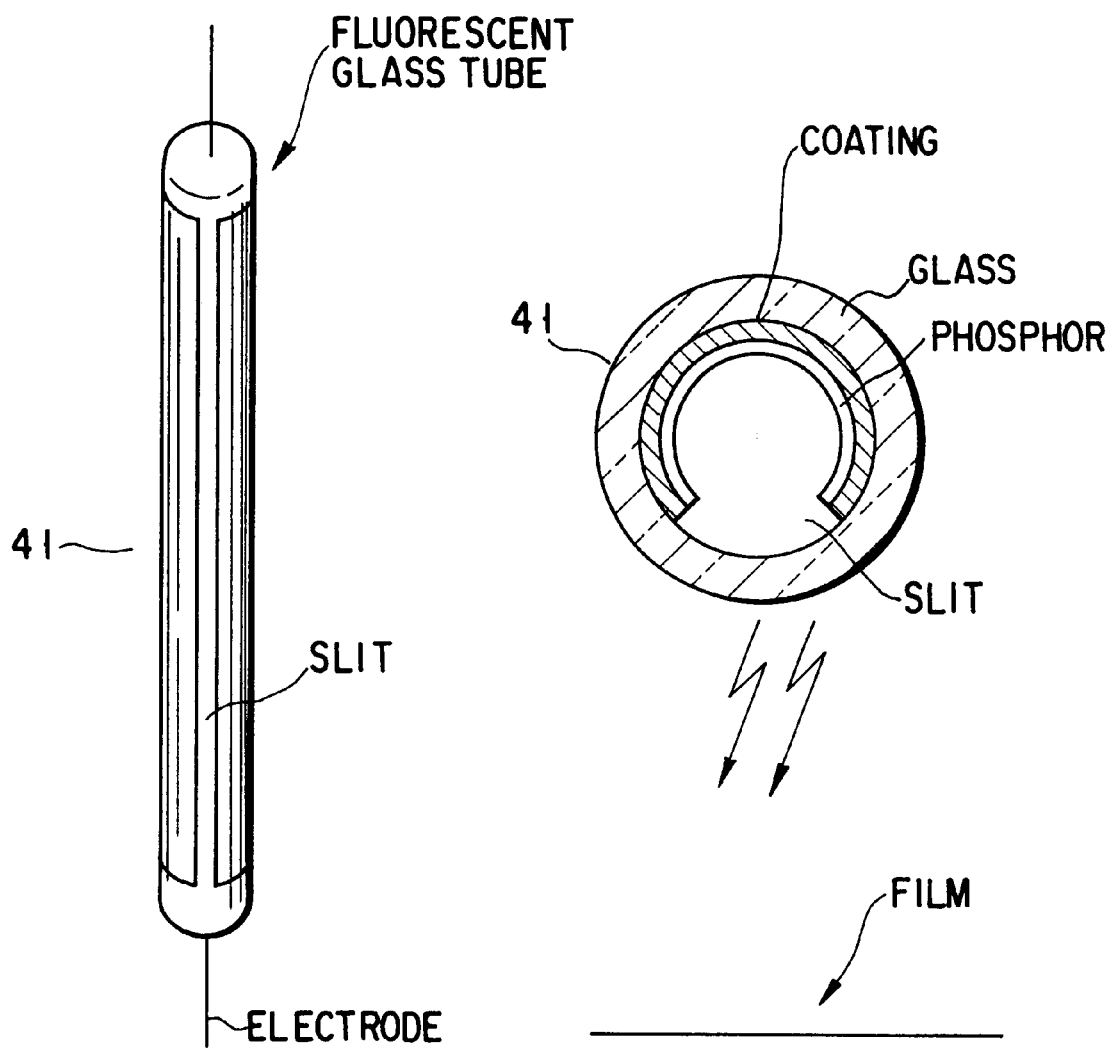
FIGS. 8A and 8B are views showing a structure in which the inner surface of a fluorescent glass tube of a fluorescent lamp is coated with a reflecting film and the reflecting film is coated with a phosphor.

As shown in FIGS. 8A and 8B, the inner surface of a fluorescent glass tube is coated with a reflecting film, and this reflecting film is coated with a phosphor.

A slit opening about 1 to 2 mm wide is formed in a film opposing surface of the fluorescent tube. Principal illuminating light is obtained through this opening.

In the fluorescent lamp 41 with this construction, no phosphor is present in the slit portion. This prevents mercury existing in the form of a gas in the tube from adhering to the slit portion and also eliminates the problem of uneven coating of the phosphor. Consequently, an even light source is obtained.

"Description of Sub-scan System"

A stepping motor driving unit 5 is a driving circuit for sub-scanning a film or an original. In this embodiment, a stepping motor 6 drives a carriage 8.

The line CCD 7, an imaging lens optical system 28, and the fluorescent lamp 41 are fixed along the same optical axis to this carriage 8.

An electrical signal of one image is obtained by scan (sub-scan) of the carriage 8 and scan (main scan) of the line CCD 7. The output electrical signal is converted by an AD-converting unit 39 and applied to a control unit 38.

The carriage 8 threadably engages with a feed screw 9 connected to the stepping motor 6 by gears 10a and 10b.

The carriage 8 is also connected to a slide bar 42 fixed to the scanner main body 11.

With the above arrangement, sub-scan driving is performed by a step corresponding to the rotational amount (of step driving) of the stepping motor 6.

The minimum unit step of the stepping motor 6 is usually set to an "integral fraction" of the pixel width of a line CCD used on the basis of the size of the pixel width projected on the film surface by the imaging lens optical system 28.

In this embodiment, the imaging optical system is a zoom optical system. Therefore, the pixel width projected on the film surface changes in accordance with the zoom value.

Even in this case, one of unit steps closest to the pixel width is selected. Consequently, sub-scan practically having no problem can be performed in accordance with the zoom value.

The moving amount and position of the carriage 8 are obtained by counting the driving pulses of the stepping motor 6 in synchronism with output signals from a start PI (Photo Interrupter) 12 and an end PI 15.

Note that the relative position of the carriage 8 with respect to the picture to be imaged can be calculated on the basis of adjustment values written in an EEPROM (not shown) and the driving pulse amount described above.

This allows the scanner main body 11 to read a predetermined image from a film original.

The PIs 12 and 15 can detect whether light-shielding members 13 and 14 attached to the carriage 8 are shielding or not shielding them from light. If the PI 12 or 15 detects light interception, driving of the stepping motor 6 in that direction (i.e., driving in a direction in which the PI is shielded from light) is inhibited.

"Description of Film Driving Unit"

A film is accommodated in a wound form in a cartridge film loaded in the film adapter unit 12. A film driving motor 17 winds up the film by taking up this film on a spool 18.

Consequently, a frame corresponding to an image to be input to the film scanner system can be selected.

The film driving motor 17 winds up and rewinds the film under the control of a film driving unit 19.

The driving amount of the film is detected by fine pulse outputs from a film perforation detecting PR (Photo Reflector, not shown) and the film driven PI. On the basis of these outputs, accurate film driving control is performed.

The film driving unit 19 is controlled by a control unit 44.

In addition to this control, the control unit 44 performs predetermined communication with a control unit 38 of the scanner main body 11 to control transmission of various information, e.g., cartridge film magnetic information, optical information, adapter status information, and adjustment value information, and receive commands.

"Description of Imaging System"

The imaging lens optical system 28 projects an illuminated film image onto the line CCD (linear sensor) 7.

The film image is photoelectrically converted by the line CCD (linear sensor) 7 and converted into a digital image signal by the subsequent AD-converting unit (constituted by, e.g., a CDS circuit and an AD-converting circuit) 39.

These components are generally controlled by a RISC-CPU 38A as the control unit 38 as will be described later.

The line CCD (linear sensor) 7 is a 3-line color (image) sensor including three lines of R, G, and B.

That is, the picture of a film is appropriately zoomed with an inherent zoom value by the imaging lens (zoom) optical system 28 in accordance with the type of adapter used, and projected on the line CCD 7.

Film picture sizes have a one-to-one correspondence with the adapters used. Therefore, the number of input pixels in the main scan direction can be held almost constant regardless of the size of film picture.

A zoom driving unit 29 performs zoom driving by driving a zoom motor 30.

The zoom driving amount to be set is given by the rotation of a PI gear interlocked with the zoom motor 30 and a pulse output obtained when a light-shielding plate 35 shields or does not shield a PI 32 from light in accordance with the rotation.

The zoom value is calculated by the pulse amount of the PI 32 synchronized with output signals from a start PI 33 and an end PI 34.

An appropriate zoom value can be calculated on the basis of adjustment values previously written in, e.g., an EEPROM (to be described later) and the driving pulse amount described above.

With this zoom movement, a focusing unit 45 drives the zoom optical system to a predetermined position on the basis of a value based on the adjustment values written in the EEPROM, the zoom value described above, and the information of an attached adapter, thereby optimally adjusting the focal point.

Driving for this focusing is done by driving a focusing motor 46.

The focusing amount to be set is given by the rotation of a PI gear interlocked with the motor 46 and a pulse output obtained when a light-shielding plate 47 shields or does not shield a PI 48 from light in accordance with the rotation.

"Description of Communication Unit"

In this film scanner, the control unit 38 is connected to a PC (Personal Computer) 36 by a two-way communication unit 37. This allows the control unit 38 to transmit the input RGB image data to the PC 36 or receive a command from the PC 36 to execute processing corresponding to the command request.

The control unit 38 and the PC 36 are connected by, e.g., SCSI, IEEE1284, IEEE1394, or USB.

"Description of Control Unit (RISC)"

All of the control operations described above are primarily performed by the control unit 38 of the scanner main body 11.

This control unit 38 also controls the line CCD 7, the AD-converting unit 39, and the like and transfers the obtained digital image data to the PC 36 through the communication unit 37.

In the present invention, the control unit 38 is constituted by a RISC microcomputer.

RISC is an abbreviation for Reduced Instruction Set Computer and can execute one instruction per clock of a clock oscillation frequency.

In contrast, conventional CPUs are CISC (Complexed Instruction Set Computer) CPUs, and even the fastest one requires four clocks to execute one instruction.

CCD drive control signals and control signals for controlling an interface circuit including an amplifier, a clamp circuit, and an AD converter are high-speed complicated control signals. Therefore, no conventional CISC CPU can input or output these control signals by using CPU ports.

Accordingly, it is of course difficult for conventional CISC CPUs to perform a plurality of different high-speed control signal output processes such as motor drive control and CCD control, data input processes, and input data arithmetic operations by "multi-task".

When a conventional CIS CPU is used, therefore, a general approach is to provide a dedicated control IC for controlling a CCD, an interface IC, and a motor driver and allow the CPU to perform the above control processes in collaboration with this control IC.

This increases the number of ICs to be mounted and the area occupied by these ICs. Consequently, it is difficult to make the scanner itself compact and reduce the cost of the scanner.

In consideration of the above problems, this embodiment uses a RISC microcomputer (RISC-CPU) as the control unit 38. The control signals described above are directly input to and output from the I/O ports of this RISC-CPU. This eliminates the need for the aforementioned external circuits and thereby greatly decreases the number of components and the area occupied by these components. Consequently, it is possible to make the scanner compact and reduce the cost of the scanner.

Figure 9:
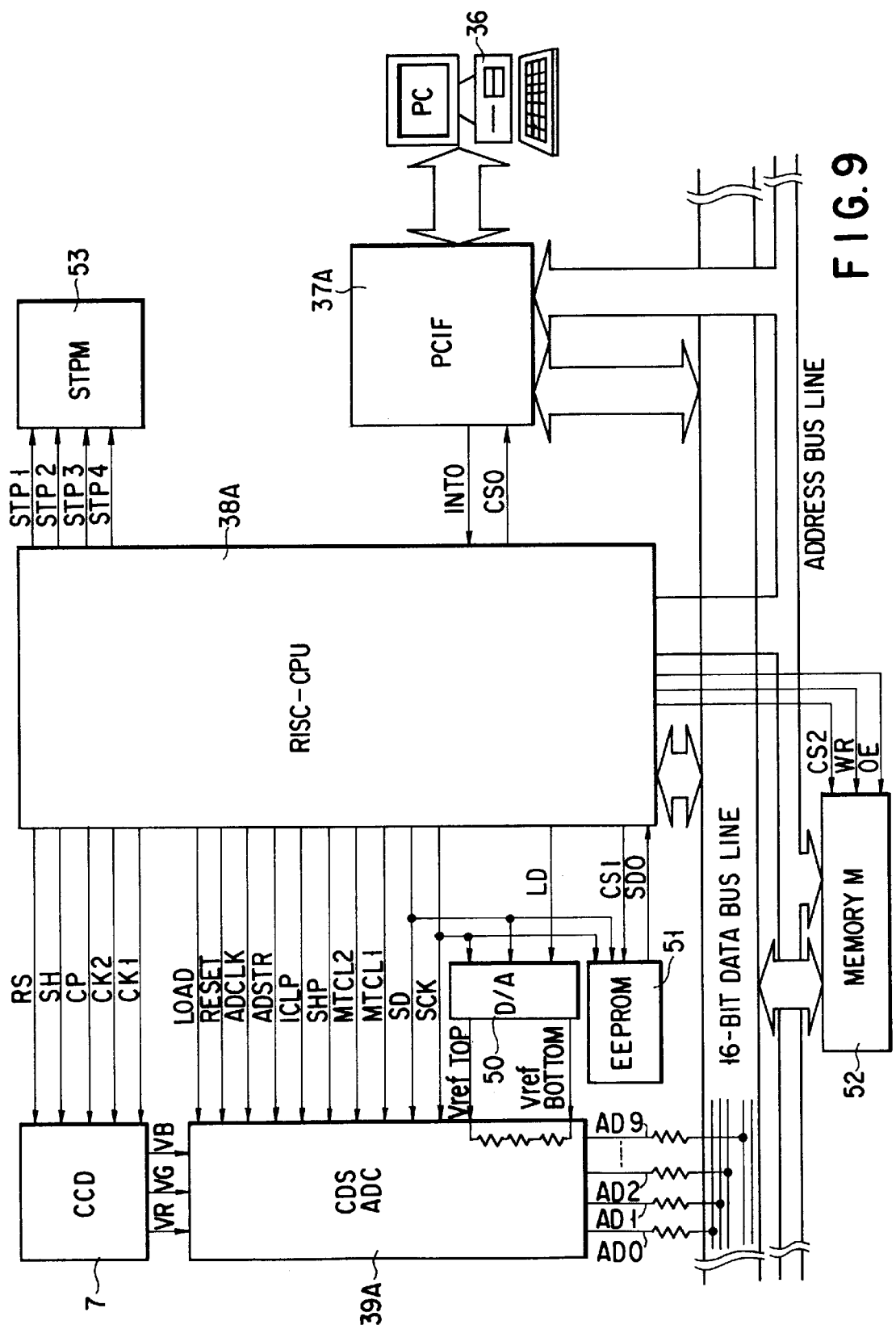
FIG. 9 is a view showing a circuit configuration using a RISC microcomputer as the core of a control unit, a stepping motor driving unit, and a communication unit shown in FIG. 7.

FIG. 9 shows an example of a circuit using a RISC microcomputer as the core of the control unit, the stepping motor driving unit, and the communication unit shown in FIG. 7.

This circuit configuration will be described in detail below.

As described earlier, the line CCD 7 is connected to five control lines RS, SH, CP, CK1, and CK2 from ports of the RISC-CPU 38A as the control unit 38. The timings of pulses output to these control lines are incorporated as programs (firmware) of the RISC-CPU 38A.

Integration is performed for the line CCD 7 in accordance with pulse signals from these control lines. The resulting RGB outputs are applied as VR, VG, and VB to a subsequent CDS/ADC circuit 39A as the A/D conversion unit 39.

This CDS/ADC circuit 39A is also connected to ten control lines LOAD, RESET, ADCLK, ADSTR, ICLP, SHP, MTCL2, MTCL1, SD, and SCK from ports of the RISC-CPU 38A, and controlled by software in accordance with signals output to these control lines.

Output voltages from a D/A circuit 50 are supplied as AD-conversion reference voltages Vrefbottom and Vreftop of the CDS/ADC circuit 39A.

The output voltages from the D/A circuit 50 are set as data by serial communication by the RISC-CPU 38A.

This serial communication is done by using three lines SD, SCK, and LD.

The data to be set in the D/A circuit 50 is determined by the RISC-CPU 38A on the basis of MAX and MIN of image density.

The above serial communication lines are also connected to the CDS/ADC circuit 39A described above and an EEPROM 51. Therefore, the RISC-CPU 38A can write data in and read out data from the EEPROM 51 at any time.

Data reads/writes from/to this EEPROM 51 are done by using four control lines SD, SCK, CS1, and SD0.

By using these control lines, the RISC-CPU 38A can cause the CDS/ADC circuit 39A to AD-convert the outputs VR, VG, and VB from the line CCD 7. 10-bit data outputs (AD0 to AD9) thus AD-converted by the CDS/ADC circuit 39A are connected to external data bus lines (16 bits) through resistors.

These external data bus lines are together connected to a PCIF 37A which is an interface IC circuit used as the communication unit 37 for the PC 36, a memory circuit 52, and the like.

The resistors inserted into the 10-bit data output (AD0 to AD9) lines are so set as to have values by which the AD outputs from the CDS/ADC circuit 39A do not compete with other outputs from the circuit.

This configuration obviates the need for any special input port for applying the AD outputs from the CDS/ADC circuit 39A to the RISC-CPU 38A. Consequently, the number of ports and the chip size of the RISC-CPU 38A can be reduced.

Since the mounting area of the substrate can be further reduced by this configuration, it is possible to make the film scanner system compact as a whole and reduce the cost of the system.

The AD-converted data from the CDS/ADC circuit 39A is temporarily stored in the memory circuit 52 by a DMAC (Direct Memory Access Controller) function of the RISC-CPU 38A.

The data amount stored in the memory circuit 52 corresponds to the sum of one-line data of R, G, and B of the line CCD 7.

Write control to the memory circuit 52 is performed by using three control lines CS2, WR, and OE of the RISC-CPU 38A.

The PCIF 37A is a protocol controller IC for performing data communication with the PC 36 and exchanges data and commands with the PC 36.

Command read and data request to the RISC-CPU 38A are performed by using an interrupt line INTO.

When this interrupt occurs, the RISC-CPU 38A reads out command data from or transfers data to the PCIF 37A through address and data bus lines and a control line CSO.

The RISC-CPU 38A can drive a stepping motor (STPM) 53 by an arbitrary number of pulses by using four control lines STP1, STP2, STP3, and STP4.

In this manner the RISC-CPU 38A drives the CCD imaging optical system as described previously, performs CCD integration/AD conversion for each driving, and transfers line image data to the PC 36.

Consequently, the PC 36 can acquire image data from the film scanner system.

Figure 10A:
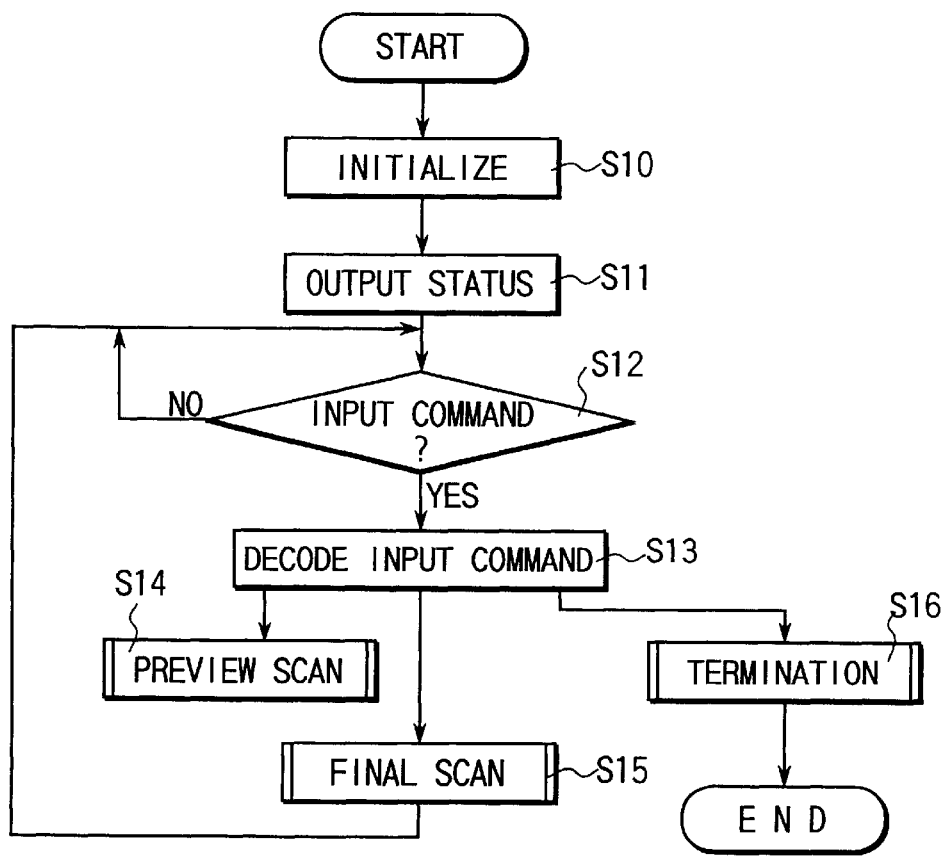
FIG. 10A is a flow chart showing a main routine for executing two-pass scan including preview scan and final scan among other operations of the film scanner system according to the embodiment of the present invention.

FIG. 10A is a flow chart showing a main routine for executing two-pass scan including preview scan and final scan among other operations of the film scanner system according to this embodiment.

Note that the steps of loading and unloading a film cartridge are omitted from FIG. 10A.

Preview scan herein mentioned is one of basic operations included in a film scanner system of this sort, i.e., scanning for roughly reading an image to be read and displaying the read image on a monitor of the PC 36.

That is, a film scanner system of this sort includes two-pass scan by which one image to be read is read twice by preview scan and final scan.

Referring to FIG. 10A, the RISC-CPU 38A first initializes the internal circuits and mechanisms of the film scanner system (step S10).

Subsequently, the RISC-CPU 38A outputs the internal status of the film scanner system to the PC 36 as an external device (step S11) and also waits for a command from the PC 36 (step S12).

If a certain command is input from the PC 36, the RISC-CPU 38A decodes the input command (step S13).

If the RISC-CPU 38A determines that this command indicates preview scan, the RISC-CPU 38A executes preview scan (step S14) and returns to step S12.

If the RISC-CPU 38A determines that the command from the PC 36 indicates final scan, the RISC-CPU 38A executes final scan (step S15) and returns to step S12.

If the RISC-CPU 38A determines that the command from the PC 36 is a termination command, the RISC-CPU 38A executes a termination process (step S16).

Figure 10B:
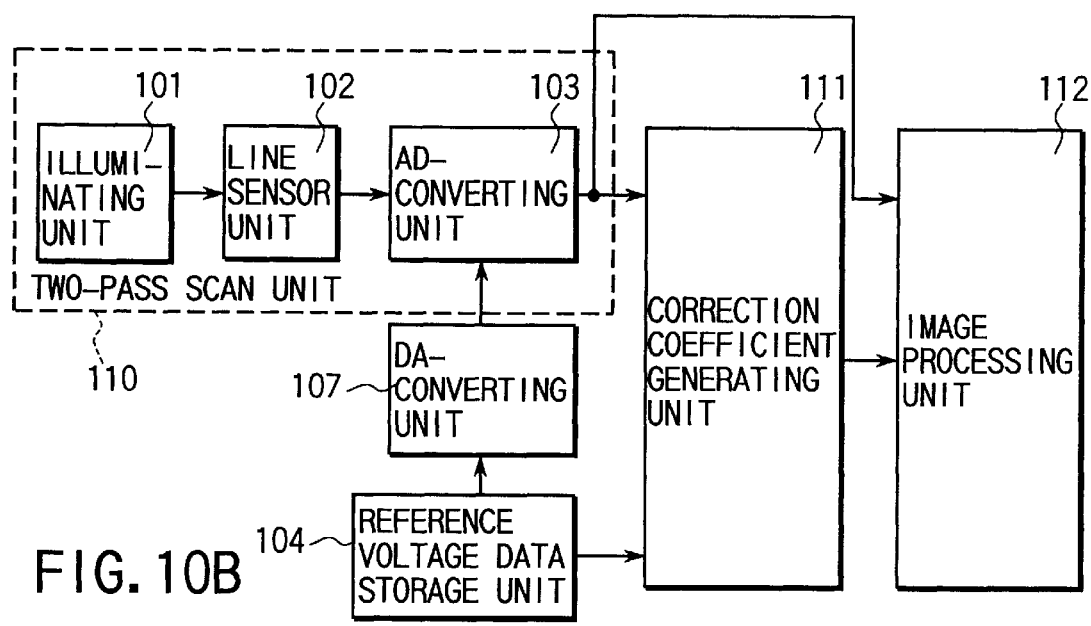
FIG. 10B is a schematic block diagram showing the fifth arrangement of the image reading apparatus for executing the two-pass scan including the preview scan and the final scan among other operations of the film scanner system according to the embodiment of the present invention.

FIG. 10B is a schematic block diagram showing the fifth arrangement of the image reading apparatus for executing two-pass scan including preview scan and final scan among other operations of the film scanner system according to this embodiment as described above.

This image reading apparatus includes an illuminating unit 101, a line (image) sensor unit 102 such as a CCD, an AD-converting unit 103, a two-pass scan unit 110, a correction coefficient generating unit 111, and an image processing unit 112. The illuminating unit 101 is a light source for illuminating a plurality of different types of color images. The line (image) sensor unit 102 reads the color image illuminated by the illuminating unit 101 and outputs an image signal. The AD-converting unit 103 AD-converts the output from the line (image) sensor unit 102. The two-pass scan unit 110 causes the illuminating unit 101, the line (image) sensor unit 102, and the AD-converting unit 103 to perform two-pass scan including preview scan for roughly reading a color image to be read and final scan for reading the color image with predetermined resolution after the preview scan. On the basis of the preview scan execution result, the correction coefficient generating unit 111 forms an intensity distribution (color histogram) of each primary color component of the line (image) sensor output. On the basis of this color histogram, the correction coefficient generating unit 111 calculates and stores a correction coefficient by which the output signal from the line (image) sensor is converted into absolute light amount data. The image processing unit 112 causes the two-pass scan unit 110 to perform final scan, corrects the image sensor output signal by referring to the correction coefficient, and performs predetermined image processing.

The image reading apparatus further comprises a DA-converting unit 107 for setting a reference voltage and a reference voltage storage unit 104. The DA-converting unit 107 sets the reference voltage of the AD-converting unit 103 on the basis of the color image data. The reference voltage storage unit 104 stores digital data for setting the reference voltage.

The preview scan and the correction coefficient generation using the histogram data will be described in detail later.

Figure 10C:
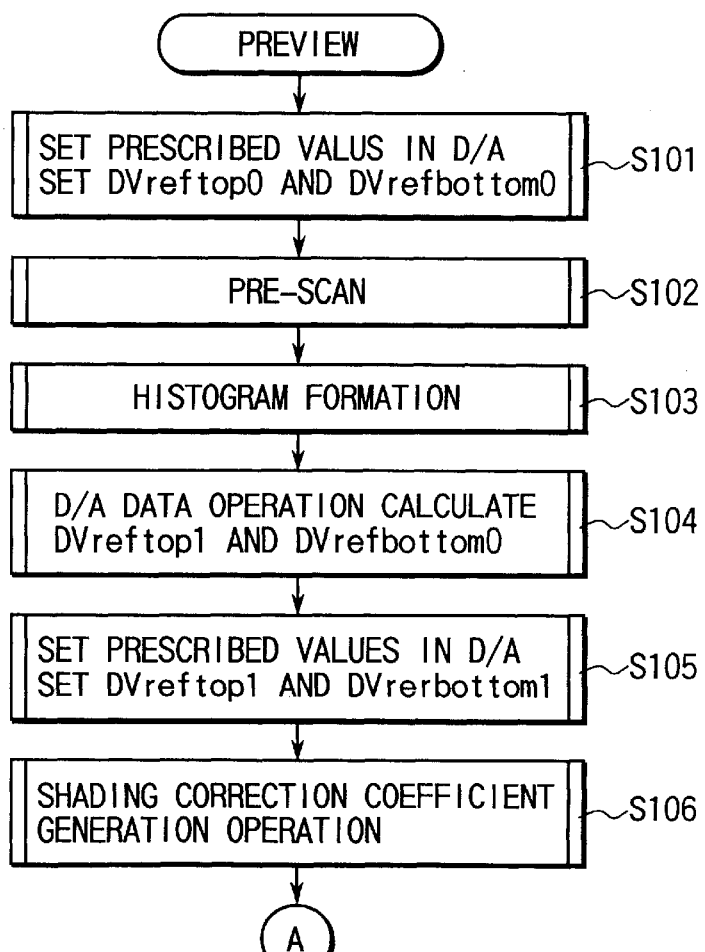
FIGS. 10C and 10D are flow charts showing the preview scan among other operations of the film scanner system according to the embodiment of the present invention.
Figure 10D:
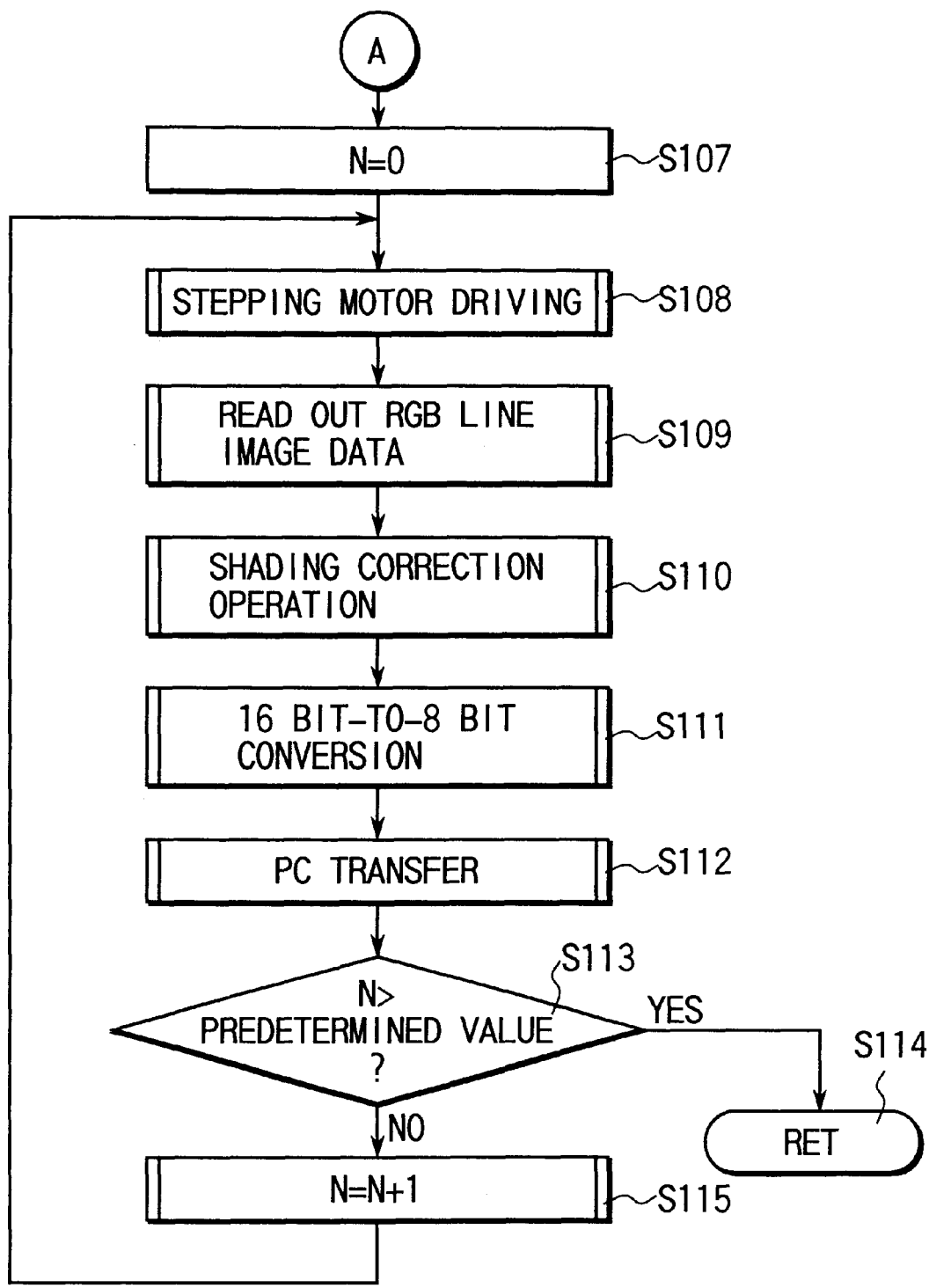

FIGS. 10C and 10D are flow charts showing the preview scan among other operations of the film scanner system according to this embodiment.

These flow charts will be described below.

Upon receiving a preview scan command from the PC 36, the film scanner system executes a preview scan routine following a procedure described below.

(Step S101)

In step S101, the RISC-CPU 38A sets prescribed values as the reference voltages Vreftop and Vrefbottom of the CDS/ADC circuit 39A.

These prescribed values are written as factory shipment adjustment values in the EEPROM 51 by taking account of individual differences in the sensitivity of the line CCD 7 and the luminance of the fluorescent lamp 41.

The prescribed values are expected design values by which MAX and MIN of image data of an image to be processed can be AD-converted. These prescribed values can also be stored as ROM values including individual differences.

As described above, the prescribed values are set as the reference voltages Vreftop and Vrefbottom of the CDS/ADC circuit 39A. Therefore, the image data always takes a value between 0 and 1,023 that can be expressed by ten bits regardless of the type of image.

The prescribed values are given as DVreftop0 and Dvrefbottom0 of digital data of the D/A circuit 50.

The output from the D/A circuit 50 swings between 0 and 5 V in accordance with a data set of 0 to 255.

(Step S102) In step S102, the RISC-CPU 38A executes a scan routine (to be referred to as pre-scan hereinafter) for obtaining a rough data structure of an image to be processed as a pre-stage of the preview scan.

That is, this pre-scan is scanning for obtaining data on the basis of which processes and arithmetic operations in steps S103 to S106 (to be described later) are executed.

In this pre-scan, data is not displayed on the monitor of the PC 36.

In the pre-scan, the RISC-CPU 38A obtains image data having a predetermined number of data (120×180 pixels) smaller than the number of data displayed on the monitor of the PC 36 in the preview scan.

(Step S103) In step S103, the RISC-CPU 38A temporarily stores the image data obtained by the above pre-scan in the memory circuit (M) 52 shown in FIG. 9 and then reads out the data to form histogram data.

Figure 11A:
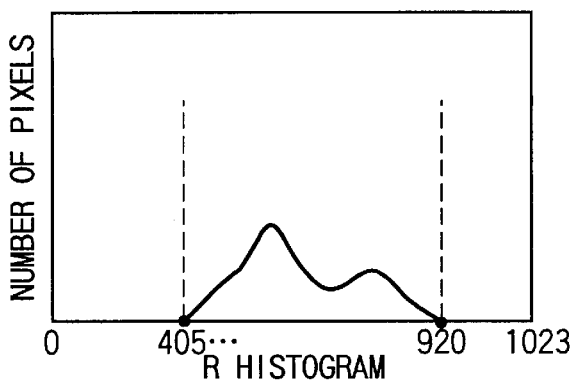
FIGS. 11A, 11B, and 11C are graphs showing R, G, and B histograms, respectively, in each of which the AD value is plotted on the abscissa and the frequency is plotted on the ordinate.
Figure 11B:
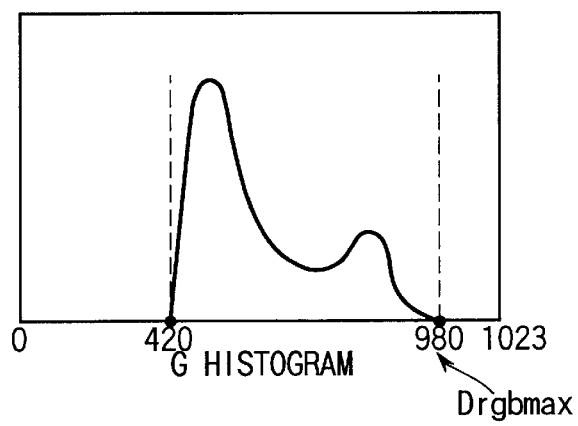
Figure 11C:
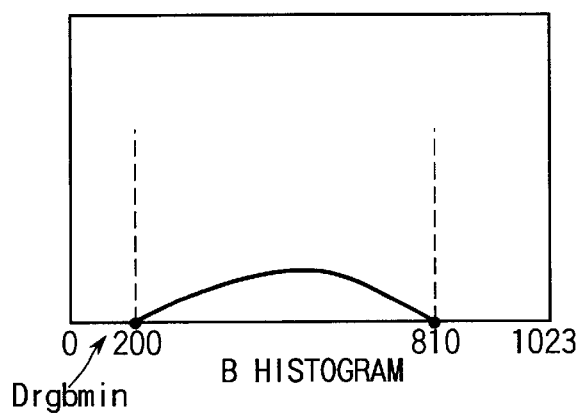

The pre-scan routine described above is performed before the preview scan. The results are R, G, and B histograms as shown in FIGS. 11A, 11B, and 11C, respectively, in each of which the AD value is plotted on the abscissa and the frequency is plotted on the ordinate.

(Step S104) In step S104, the RISC-CPU 38A calculates the Vreftop value and the Vrefbottom value of the image to be processed in the preview scan and final scan from the MAX value (Drgbmax) and the MIN value (Drgbmin) of the AD value of each of the R, G, and B histograms obtained as above.

The Vreftop value and Vrefbottom value are voltages, and these voltages are calculated as digital values DVreftop and DVrefbottom to be applied to the D/A circuit 50 by Dvrefbottom1=K0×Drgbmax+Dvrefbottom0, Dvreftop1=K0×Drgbmin+Dvrefbottom0 where K0 is a conversion coefficient of an AD-converted value and D/A data and written in the EEPROM 51.

(Step S105)

In step S105, the RISC-CPU 38A sets data DVrefbottom1 and DVreftop1 calculated as described above in the D/A circuit 50 before the preview scan and final scan.

In the preview scan and final scan, therefore, AD conversion is performed to obtain AD values on the basis of the set data DVrefbottom1 and DVreftop1.

(Step S106)

In step S106, the RISC-CPU 38A calculates and generates shading correction coefficients on the basis of data previously stored in the EEPROM 51 as will be described below. The RISC-CPU 38A stores the generated coefficients as correction amount data for individual CCD pixels in an internal RAM of the RISC-CPU 38A.

This correction amount data is stored in the form of a table such that addresses in the internal RAM of the RISC-CPU 38A correspond to pixels of the CCD. Therefore, the correction amount data of a certain pixel of the CCD can be read out by referring to the content (correction table data) in the corresponding address of the RAM. In this manner the corresponding correction value can be obtained.

Figure 12:
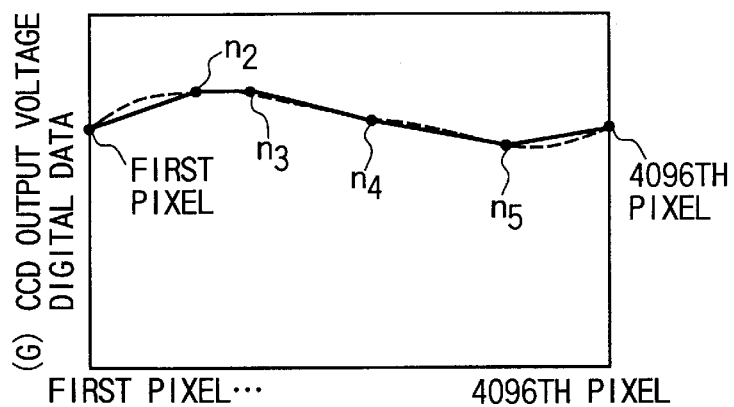
FIG. 12 is a view for explaining the process of diving pixels from the first to 4,096th pixels at arbitrary points n and linearly interpolating each divided segment in order to obtain correction table data as shading correction coefficients.

The correction table data as the shading correction coefficients to be stored in the internal RAM of the RISC-CPU 38A is data, as shown in FIG. 12, calculated by dividing pixels from the first pixel to the 4,096 th pixel at given points n and linearly interpolating each divided segment by the RISC-CPU 38A.

Referring to FIG. 12, the pixels are divided into five segments at six points n1, n2, n3, n4, n5, and n6. Note that n1 is the first pixel and n6 is the 4,096 th pixel.

Figures 13, 14:
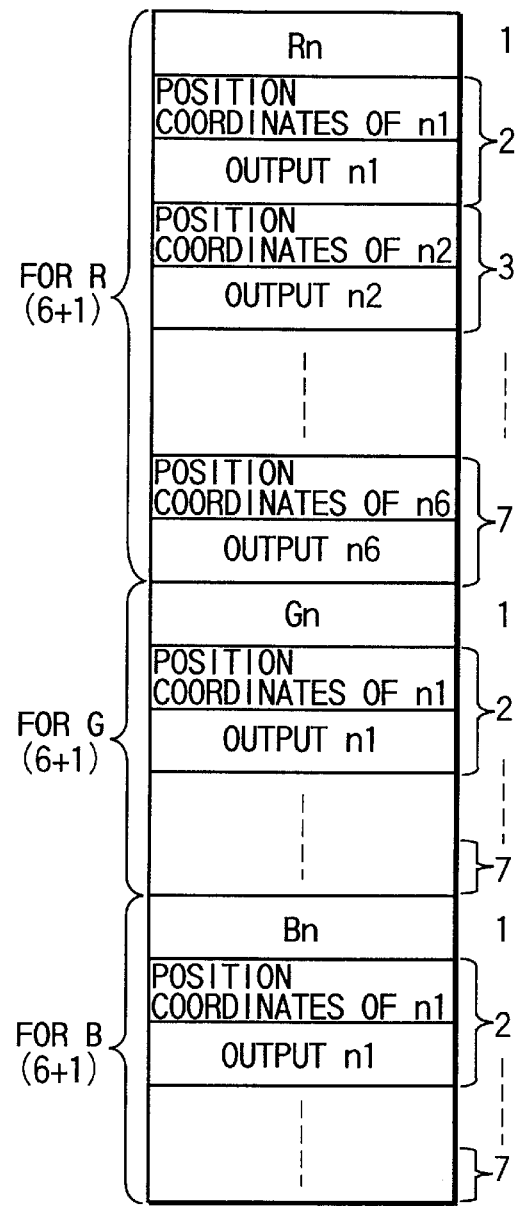
FIG. 13 is a view for explaining the process of forming the correction table data by arithmetic operations and storing the data as correction amount data for individual CCD pixels in an internal RAM of a RISC-CPU 38A.
FIG. 14 is a view for explaining the reason why (6+1)× 3=21 data need only be stored in an EEPROM 51.

In this embodiment, on the basis of data indicating the position coordinates of the pixels at these six points as the basis of this linear interpolation and pixel output data, the RISC-CPU 38A calculates and generates correction table data of 1, 2, . . . , 4,096 points as shown in FIG. 13. The RISC-CPU 38A stores the correction table data as correction amount data for individual CCD pixels in the internal RAM of the RISC-CPU 38A.

The same processing is performed for each of R, G, and B. Therefore, as the data indicating the position coordinates of the pixels at the six points as the basis of this linear interpolation and the pixel output data, (Number of G pixel points), (G pixel position coordinates, G pixel output)

(Number of R pixel points), (R pixel position coordinates, R pixel output)

(Number of B pixel points), (B pixel position coordinates, B pixel output)

are previously written in the EEPROM 51 when adjustment is performed before shipment from a factory.

In this embodiment, as shown in FIG. 14, it is only necessary to store (6+1)×3=21 data in the EEPROM 51. Therefore, only a very small memory capacity is necessary.

This is because arbitrary correction points can be set in this embodiment.

The RISC-CPU 38A reads out the data from the EEPROM 51 and calculates the correction table data as described above on the basis of the readout data.

(Step S107)

In step S107, the RISC-CPU 38A resets a counter N in the RISC-CPU 38A.

(Step S108)

In step S108, the RISC-CPU 38A drives the stepping motor (STPM) 53 to input a line image in a predetermined position of the picture to be processed which is determined in the preview scan.

(Step S109)

In step S109, the RISC-CPU 38A causes the CDS/ADC 39A to perform CCD integration for a predetermined time period and reads out RGB line image data.

This AD-converted data is temporarily stored in the memory circuit (M) 52.

(Step S110)

In step S110, the RISC-CPU 38A reads out the data of RGB pixels from the memory circuit (M) 52 and performs an arithmetic operation for shading correction for the RGB pixels by referring to the correction table data in the internal RAM of the RISC-CPU 38A.

This shading correction arithmetic operation is performed as follows after being temporarily converted into virtual 16-bit digital data proportional to the CCD output voltage (correction pixel data)=(correction coefficient)×((pixel data)+DVrefbottom1×K1−Dblack1)

where K1=1023/(DVreftop1−DVrefbottom1), and (Pixel data)+DVrefbottom1×K1 is the 16-bit digital pixel data in the virtual region, and black level data (Dblack1)=(Dblack0/K0+ DVrefbottom0)×K1 where K0=1023/(DVreftop0−DVrefbottom0), and this is 16-bit black level data in the virtual region.

Note that the black level data (Dblack1) is the average of pixel output data obtained by shielding a CCD from light with an aluminum foil and is omitted from the above explanation. The black level data is obtained by converting the AD-converted value Dblack0 obtained in the pre-scan into the value Dblack1 in the virtual region.

In this embodiment as described above, the shading correction is performed after data is converted into digital data having a one-to-one correspondence with the CCD output voltages. Therefore, the correction can be performed with a single correction parameter no matter how Vreftop and Vrefbottom of the AD converter change in accordance with the type of image to be processed.

In this embodiment, therefore, no large number of correction parameters need to be stored unlike in the conventional technologies. In addition, fine AD conversion is possible.

Furthermore, the above method is effectively used not only in simple shading correction but also in, e.g., a color correction operation and a gradation correction operation.

(Step S111)

In step S111, the RISC-CPU 38A performs color conversion and gradation conversion operations for the 16-bit data obtained as described above and converts the data into 8-bit data.

This 8-bit data is overwritten in the memory circuit (M) 52.

(Step S112)

In step S112, of the 8-bit data obtained as described above, the RISC-CPU 38A reads out only pixel data in a predetermined address from the memory circuit (M) and transfers the data to the PC 36 via the PC interface circuit (PCIF) 37A.

(Step S113)

In step S113, the RISC-CPU 38A checks whether the counter N of the RISC-CPU 38A is a predetermined value. If the counter N is smaller than the predetermined value, the RISC-CPU 38A increments the counter N and returns to step S108. If the counter N has reached the predetermined value, the flow returns in step S114.

Processing performed when the digital value and the voltage output value are not proportional, such as when the D/A circuit 50 has a quantization error as shown in FIG. 15A or when the swing width as shown in FIG. 15B dose not start from OV and has some bias, will be described below.

In a case like this, the set digital value of the D/A circuit 50 must be converted into a digital value proportional to a true voltage.

In this embodiment, actual output voltage converted values of digital data from 0 to 255 as set values of the D/A circuit 50 are individually measured. As shown in FIGS. 16A and 16B, the measured data is written in those addresses of the EEPROM 51 which correspond to the D/A set values.

On the basis of these values, the correction operations for DVrefbottom and DVreftop described above are performed.

In the above embodiment, 256 data are stored in the EEPROM 51. However, it is also possible to store only a data region to be actually used, e.g., 100 data from 40 to 130.

That is, the number of data to be stored can be properly determined in accordance with the design.

Furthermore, in the same manner as the shading correction described above, it is also possible to store only interpolation parameters and calculate the digital values by interpolation arithmetic expressions.

Color conversion is subsequently performed for R1, G1, and B1 data subjected to the shading correction.

In this color conversion operation, the RISC-CPU 38A performs the following matrix operation $$\begin{bmatrix} R2 \\ G2 \\ B2 \end{bmatrix} = \begin{bmatrix} D11 & D12 & D13 \\ D21 & D22 & D23 \\ D31 & D32 & D33 \end{bmatrix} \begin{bmatrix} R1 \\ G1 \\ B1 \end{bmatrix}$$

In this embodiment, the color conversion is performed by the above matrix operation. However, conversion using a table reference method or other program conditional branch can also be performed.

After the color conversion, the RISC-CPU 38A performs the following gradation conversion for R2, B2, and G2 data $R3 = K(I) \times R2$, $G3 = K(I) \times G2$, $B3 = K(I) \times B2$, $I = R2 + B2 + G2$ where K(I) is a coefficient whose parameter is I.

In the embodiment of the present invention as described above, arithmetic operations are performed for CCD converted values. Accordingly, various arithmetic operations can be performed with a single conversion parameter regardless of AD reference voltage conditions when an image is read.

In the present invention as described above, although a plurality of different types of images are read, shading correction using a single correction parameter can be performed without detecting the type of image.

Also, in the present invention, images can be read with high resolution by changing the AD conversion reference voltage (Vref). Since this image read does not adversely affect shading correction to deteriorate the image quality, image data having extremely high gradation and quality can be obtained.

Accordingly, the present invention can provide an image reading apparatus capable of obtaining high-quality images regardless of the types of color originals by performing equal shading correction processes regardless of the types of color originals without wasting memory capacity.

Additional advantages and modifications will readily occur to those skilled in the art. Therefore, the invention in its broader aspects is not limited. to the specific details and representative embodiments shown and described herein. Accordingly, various modifications may be made without departing from the spirit or scope of the general inventive concept as defined by the appended claims and their equivalent.

What is claimed is:

1. An image reading apparatus comprising:

illuminating means for illuminating a color image;

an imaging device that reads the color image illuminated by said illuminating means and outputs an image signal;

AD-converting means for performing analog-to-digital (AD) conversion of the output image signal from said imaging device;

storage means for storing digital data corresponding to a reference voltage of said AD-converting means;

converting means for generating digital data corresponding to the output image signal of said imaging device based on output data from said AD-converting means and the digital data stored in said storage means; and shading correction means for performing shading correction of an output from said converting means.

2. An image reading apparatus comprising:

illuminating means for illuminating a color image;

an imaging device that reads the color image illuminated by said illuminating means and outputs an image signal;

AD-converting means for performing analog-to-digital (AD) conversion of the output image signal from said imaging device;

reference voltage setting means for setting a reference voltage of said AD-converting means based on the output image signal from said imaging device;

storage means for storing digital data corresponding to the reference voltage set by said reference voltage setting means;

converting means for generating digital data corresponding to the output image signal of said imaging device based on output data from said AD-converting means and the digital data stored in said storage means; and shading correction means for performing shading correction of an output from said converting means.

3. An image reading apparatus comprising:

illuminating means for illuminating a color image;

an imaging device that reads the color image illuminated by said illuminating means and outputs an image signal;

AD-converting means for performing analog-to-digital (AD) conversion of the output image signal from said imaging device;

storage means for storing digital data corresponding to a reference voltage of said AD-converting means;

converting means for generating digital data corresponding to the output image signal of said imaging device based on output data from said AD-converting means and the digital data stored in said storage means; and arithmetic means for performing at least one of a shading correction operation, a color conversion operation, and a gradation conversion operation with respect to an output from said converting means.

4. An image reading apparatus comprising:

illuminating means for illuminating a plurality of different types of color images;

a line sensor adapted to read at least one of the color images and to output an image signal;

AD-converting means for AD-converting an output from the line sensor;

storage means for storing digital data corresponding to a reference voltage of said AD-converting means;

converting means for generating digital data corresponding to a CCD output voltage based on output data from said AD-converting means and the digital data stored in said storage means; and shading correction means for performing shading correction based on an output from said converting means.

5. An image reading apparatus comprising:

illuminating means for illuminating a color image;

a line sensor adapted to read at least one of the color images and to output an image signal;

AD-converting means for AD-converting an output from the line sensor;

reference voltage setting means for setting a reference voltage of said AD-converting means based on color image data;

storage means for storing digital data for setting the reference voltage;

converting means for generating digital data corresponding to a CCD output voltage based on output data from said AD-converting means and the digital data stored in said storage means; and shading correction means for performing shading correction based on an output from said converting means.

6. An image reading apparatus comprising:

illuminating means for illuminating a plurality of different types of color images;

a line sensor adapted to read at least one of the color images and to output an image signal;

AD-converting means for AD-converting an output from the line sensor;

DA-converting means for setting a reference voltage of said AD-converting means;

storage means for storing digital data corresponding to said DA-converting means;

first converting means for generating first digital data corresponding to a CCD output voltage based on the digital data stored in said storage means;

second converting means for the generating second digital data corresponding to a CCD output voltage based on an output from said AD-converting means and an output from said first converting means; and shading correction means for performing shading correction based on an output from said second converting means.

7. An image reading apparatus comprising:

illuminating means for illuminating a plurality of different types of color images;

a line sensor adapted to read at least one of the color images and to output an image signal;

AD-converting means for AD-converting an output from the line sensor;

storage means for storing digital data corresponding to a reference voltage of said AD-converting means;

converting means for generating digital data corresponding to a CCD output voltage based on output data from said AD-converting means and the digital data stored in said storage means; and arithmetic means for performing at least one of a shading correction operation, a color conversion operation, and a gradation conversion operation with respect to an output from said converting means.

8. An image reading apparatus comprising:

illuminating means for illuminating a color image;

an imaging device that reads the color image illuminated by said illuminating means and outputs an image signal;

AD-converting means for performing analog-to-digital (AD) conversion of the output image signal from said imaging device;

storage means for storing digital data corresponding to a reference voltage of said AD-converting means;

converting means for generating digital data corresponding to the output image signal of said imaging device based on output data from said AD-converting means and the digital data stored in said storage means; and arithmetic means for performing a correction operation with respect to an output from said converting means.

9. An image reading apparatus comprising:

illuminating means for illuminating a color image;

an imaging device that reads the color image illuminated by said illuminating means and outputs an image signal;

AD-converting means for performing analog-to-digital (AD) conversion of the output image signal from said imaging device;

reference voltage setting means for setting a reference voltage of said AD-converting means based on the output image signal from said imaging device;

storage means for storing digital data corresponding to the reference voltage;

converting means for generating digital data corresponding to the output image signal of said imaging device based on output data from said AD-converting means and the digital data stored in said storage means; and arithmetic means for performing a correction operation with respect to an output from said converting means.

10. An apparatus according to claim 8, wherein said arithmetic means comprises means for performing a shading correction operation.

11. An apparatus according to claim 9, wherein said arithmetic means comprises means for performing a shading correction operation.

12. An apparatus according to claim 8, wherein said arithmetic means comprises means for performing a color conversion operation.

13. An apparatus according to claim 9, wherein said arithmetic means comprises means for performing a color conversion operation.

14. An apparatus according to claim 8, wherein said arithmetic means comprises means for performing a gradation conversion operation.

15. An apparatus according to claim 9, wherein said arithmetic means comprises means for performing a gradation conversion operation.

16. An apparatus according to claim 8, wherein said imaging device comprises a line sensor.

17. An apparatus according to claim 9, wherein said imaging device comprises a line sensor.

18. An apparatus according to claim 8, wherein said storage means comprises an EEPROM.

19. An apparatus according to claim 9, wherein said storage means comprises an EEPROM.

* * * * *